United States Patent [19]

Gerry

[11] 4,206,736
[45] Jun. 10, 1980

[54] HIGH POWER AC IGNITION SYSTEM

[76] Inventor: Martin E. Gerry, 13452 Winthrope St., Santa Ana, Calif. 92705

[21] Appl. No.: 960,871

[22] Filed: Nov. 15, 1978

[51] Int. Cl.² ............... F02P 1/00; H05B 37/02
[52] U.S. Cl. ................. 123/148 E; 123/148 CB; 315/209 T
[58] Field of Search ..... 123/148 B, 148 CB, 148 CA, 123/148 DK, 148 E; 315/209 CD, 209 T

[56] References Cited

U.S. PATENT DOCUMENTS

| | | | |
|---|---|---|---|
| 3,049,642 | 8/1962 | Quinn | 123/148 CB |
| 3,438,362 | 4/1969 | Clyborne et al. | 315/209 T |
| 3,952,715 | 4/1976 | Van Siclen, Jr. | 315/209 CD |
| 3,983,461 | 9/1976 | Jordan | 123/148 CB |
| 4,064,415 | 12/1977 | Blackington | 315/209 CD |
| 4,123,689 | 10/1978 | Gerry | 123/148 E |
| 4,133,329 | 1/1979 | Caron | 315/209 CD |

FOREIGN PATENT DOCUMENTS

1281733 12/1961 France .................. 123/148 CB

*Primary Examiner*—P. S. Lall

[57] ABSTRACT

An ignition system includes an alternating current power source which feeds a transformer having a primary winding, the primary winding being coupled to an electronic switch. The electronic switch intermittently interrupts current flowing in the primary winding and in the output circuit of the power source. Such electronic switch is made operable by virtue of the peak excursions of the alternating current thus supplying the necessary collector potential to such switch during each firing cycle of the system. A capacitor in series with the output circuit of the power source and with the primary winding enables current to be transferred out of the power source to such primary winding. Such electronic switch also provides discrete separation between successive output waveforms of successive ignition firing cycles. The system has appropriate logic circuits which initiate current conduction through the electronic switch and in the oscillator stages of the power source for each firing cycle, turning off the switch and oscillator stages between firing periods. Various types of trigger timing circuits are usable to trigger the several logic circuits for initiating igniter firing by means of the resultant high voltage and high current in the secondary winding of the transformer.

23 Claims, 16 Drawing Figures

The integro-differential equations for the equivalent circuit are:

$$v_0(t) = L\frac{di_0}{dt} + Ri_0 + \frac{1}{C}\int i_0 \, dt \qquad (1)$$

$$v_1(t) = L\frac{di_1}{dt} + Ri_1 + \frac{1}{C}\int i_1 \, dt \qquad (2)$$

$$\text{where} \quad v_0(t) = V_0\left[u(t) - \sum_{n=1}^{\infty}(-1)^n u(t-2nk)\right] \qquad (3)$$

$$v_1(t) = \alpha V_1[u(t) - u(t-T)] \qquad (4)$$

The transient solution of equation (1) is:

$$i_0 = \sqrt{\frac{C}{L}}\, V_0 e^{-\frac{R}{2L}t}\left\{\sin\frac{t}{\sqrt{LC}} - 2e^{\frac{kR}{L}}\sin\frac{(t-2k)}{\sqrt{LC}} + 2e^{\frac{2kR}{L}}\sin\frac{(t-4k)}{\sqrt{LC}}\right\} \qquad (5)$$

The transient solution of equation (2) is:

$$i_1 = \alpha V_1 \sqrt{\frac{C}{L}}\, e^{-\frac{R}{2L}t}\left\{\sin\frac{t}{\sqrt{LC}} - e^{\frac{TR}{2L}}\sin\frac{(t-T)}{\sqrt{LC}}\right\} \qquad (6)$$

The total primary circuit current is:

$$i = i_0 + i_1 \qquad (7)$$

The induced primary voltage due to (5) is:

$$e_0 = -\frac{L_1}{L}V_0 e^{-\frac{R}{2L}t}\left\{\cos\frac{t}{\sqrt{LC}} - 2e^{\frac{kR}{L}}\cos\frac{(t-2k)}{\sqrt{LC}} + 2e^{\frac{2kR}{L}}\cos\frac{(t-4k)}{\sqrt{LC}}\right\} \qquad (8)$$

The voltage due to (6) is:

$$e_1 = -\frac{L_1}{L}\alpha V_1 e^{-\frac{R}{2L}t}\left\{\cos\frac{t}{\sqrt{LC}} - e^{\frac{TR}{2L}}\cos\frac{(t-T)}{\sqrt{LC}}\right\} \qquad (9)$$

The total primary induced voltage is:

$$e = e_0 + e_1 \qquad (10)$$

$$P(\text{pri. ckt. instantaneous power}) = ie = (7.1)(1130) = 8023 \text{ watts} \qquad (11)$$

$$\mathcal{E}(\text{pri. ckt. energy}) = Pt\, T^2 = (8023)(.833 \times 10^{-3})(.25) = 1.67 \text{ watt-sec.} \qquad (12)$$

$$\mathcal{E}(\text{igniter firing energy}) = \eta \mathcal{E}_{PRI} = (.9)(1.67) = 1.5 \text{ watt-sec.} \qquad (13)$$

$$N = \frac{\mathcal{E}_{\text{igniter}}}{\mathcal{E}_{\text{KETTERING}}} = \frac{1.5}{0.936 \times 10^{-2}} = 160 \qquad (14)$$

FIG. 7

PRIMARY VOLTAGE $e_o$

Q2 IN CIRCUIT

1200 VOLTS

Q2 NOT IN CIRCUIT

PRIMARY CURRENT $i$

Q2 IN CIRCUIT 8.33 AMPS.

Q2 NOT IN CIRCUIT

18 MILLIMETER SPARK PLUG
arc diameters=0.55 in.= 14 mm.
arc area = 77 square mm.

14 MILLIMETER SPARK PLUG
conventional firing arc
arc length=0.035 in.=0.9 mm.
arc area =0.8 square mm.

HIGH POWER AC IGNITION SYSTEM

INCORPORATION BY REFERENCE

U.S. Pat. No. 4,122,815 issued Oct. 31, 1978, is incorporated by reference herein as though fully set forth, for the timing method disclosed therein. Such patent is owned by same applicant.

BACKGROUND OF THE INVENTION

This invention is in the field of ignition systems and more particularly in such systems that utilize alternating current as the principal power input to an ignition transformer.

Prior art systems generally involve the use of a keyed DC power source such as a battery in order to precharge the primary winding of an ignition transformer, and to subsequently discharge such primary winding into a capacitor so as create a transient current in the primary winding. Such system is generally referred to as the Kettering system, and suffers from a low energy level being fed to an igniter to fire same.

Other prior art systems, while utilizing AC power to feed such igniter, are unable to deliver a sufficiently high current to the ignition transformer primary winding or to the secondary winding thereof for feeding the igniters, and likewise suffer from low energy levels being delivered to the igniters.

Should the problem of low energy level ever be resolved, such prior art systems will still fail to perform satisfactorily when AC powered, since at higher power and energy levels, the waveforms of voltage and current during a firing cycle could not be accurately controlled as to their duration, and consequently successive firing cycles will produce waveforms without any discontinuities therebetween, resulting in pre-ignition of fuel in the engine.

SUMMARY OF THE INVENTION

It is therefore an objective of this invention to provide a high power AC source which is automatically turned off between firing cycles, wherein the energy output of such system is substantially greater than any system employing the basic Kettering circuit.

It is also an objective of this invention to provide means for delivering higher current from the AC power source to an ignition transformer primary winding and consequently delivering higher ignition energy levels.

It is a further objective of this invention to provide an electronic or other like switch, automatically triggered by a logic circuit, so that energy residual in the AC power source output circuit will be cut-off at substantially the same time when the AC power source is keyed to its off mode between ignition firing cycles, so that discrete discontinuities between voltage and current waveforms will prevail, and thus ignition timing could be aptly controlled to avoid pre-ignition firing in the engine firing chambers.

Accordingly, an ignition system is provided having an AC power source and output means therein for delivering alternating current to such system. The alternating current may be of the rectangular waveform, triangular or saw tooth waveform, or sinusoidal.

A transformer having a primary winding coupled to the output means is provided to form the primary circuit. Switching means in the primary circuit is utilized so that when the power source is biased by means of a logic circuit to a quiescent state, the switching means acts to inhibit residual energy in a transformer of the power source from being transferred to the primary winding of the ignition transformer. Such electronic switch is enabled by virtue of the alternating current providing the requisite positive peaks imposed upon the switch collector to enable such switch to conduct without the need of the usual DC power feeding such collector. Such switching means may be an electronic switch, generally of the high power and high voltage transistor category.

A capacitor utilized in the primary circuit enables power to be transferred to such circuit from the AC power source.

The oscillator stages of the AC power source may have Darlington type circuits that provide higher outputs than the conventional high power transistors by virtue of the high DC forward current amplification characteristics of such circuits. The switching means may also utilize a Darlington transistor circuit.

It is to be noted that the switching action of the switching means provides additional energy which intermodulates with the energy from the AC power source.

Logic means, coupled to the AC power source and to the switching means, provides substantially simultaneously, bias to the power source and to the switching means for turning on the AC power source as well as causing conduction in the switching means.

Various trigger circuits are provided, such as a magnetic pulse timer unit, cam actuated contactors, an electrically conductive disk with insulative members therein and a contactor, an optical timer, or a modulated oscillator, any one of which may be coupled to the logic means.

BRIEF DESCRIPTION OF THE DRAWINGS

FIG. 7 shows in tabular form the various equations and mathematical solutions utilizing the equivalent circuit of FIG. 6.

DETAILED DESCRIPTION

Figures 1, 1A, 2:
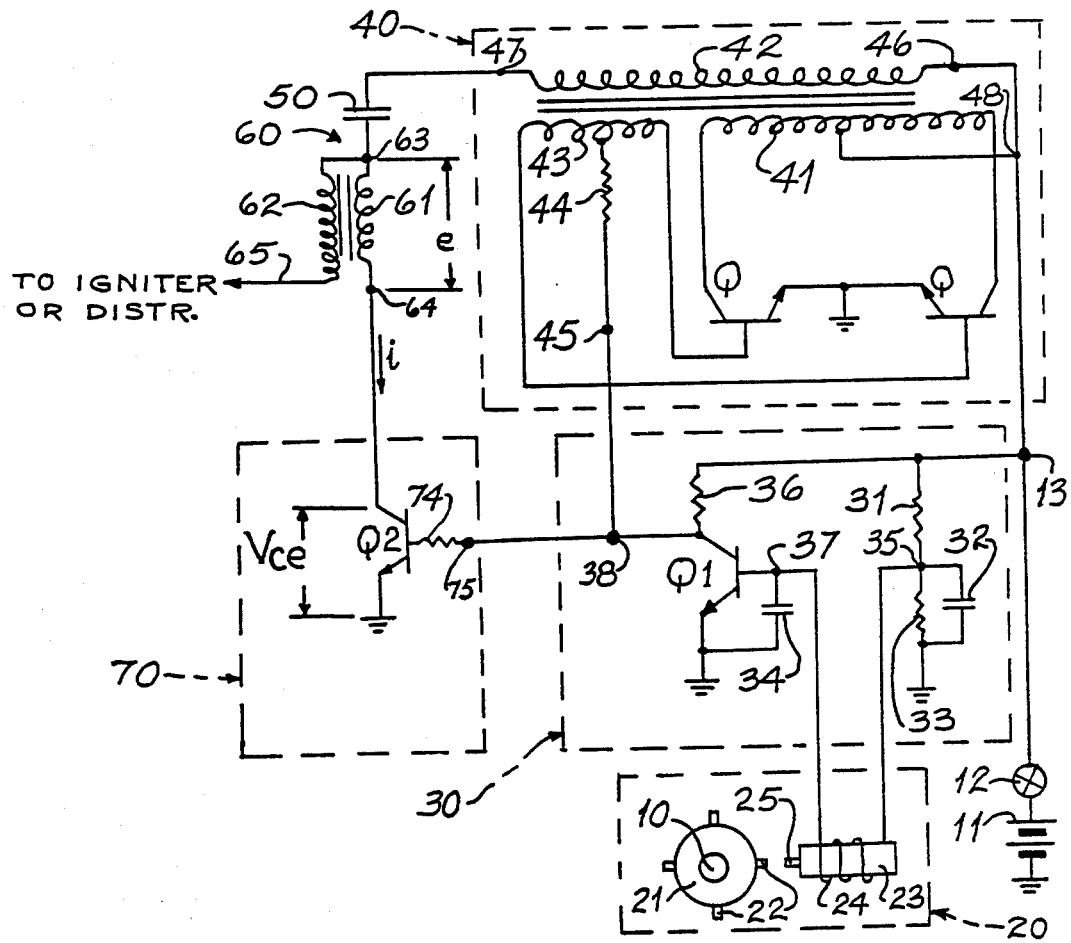
FIG. 1 is a schematic of the ignition system utilizing magnetic pulse timing according to the invention.
FIG. 1a is a schematic of the same ignition system as in FIG. 1 except that the energy switching means control is located in a different part of the system's output circuit.
FIG. 2 is a schematic of the same system illustrated in either FIGS. 1 or 1a but having cam actuated contactors as the timer.

Referring to FIG. 1, a high voltage, high current and consequently a high energy ignition system comprises an alternating current power source, a capacitor and an ignition transformer. This system features an energy inhibit switch electronically controlled by a logic circuit, which logic circuit also substantially simultaneously turns on the alternating current source during the operative period of each firing cycle of the system and turns off the alternating current power source and the energy inhibit switch during the non-firing portions or quiescent periods of the system. In FIG. 1, such logic circuit is triggered by a magnetic pulse timer.

In this specification, the conventional ground symbol is shown signifying either negative battery potential of battery 11, DC electrical return paths or AC electrical return paths, and hence such return paths and negative battery potential need not be referred to hereinbelow in explaining operation of the system.

Accordingly, battery 11, generally of the 12 volt type, provides DC power to the system through ignition switch 12 to make available such DC power at junction 13, and to feed DC power directly to logic circuit 30 and to alternating current power source 40.

Alternating current power source 40 is shown as a transistor type rectangular waveform generator, but it is to be understood that any alternating current source providing for example a saw tooth waveform, a triangular waveform or a sinusoidal waveform may be effectively used to effect this invention, in the circuits of FIG. 1 or in the circuits shown in other figures of this specification.

Magnetic pulse timer 20, conventional in the automotive field, consists of reluctance wheel 21 having regularly spaced ribs 22 at the wheel periphery, wherein wheel 21 and its ribs 22 are made of a suitable magnetic material and wherein such wheel is driven by distributor shaft 10 which is common to any automotive engine. Such timer employs permanent magnet 23 having a sensor winding 24 thereon. Magnet 23 has pole piece 25 at one end, so that when shaft 10 is driven by the engine, ribs 22 will interrupt magnetic flux lines between ribs 22 and pole piece 25, and induce a voltage in winding 24.

The magnetic timer may be designed with respect to the orientation of the north and south magnetic poles of magnet 23 as well as with respect to the direction of the turns of wire comprising winding 24, so as to provide either a leading negative or leading positive going pulse as an output of winding 24 when one of ribs 22 is driven past pole piece 25. The leading negative pulse design was adopted herein since this is conventional in the automotive industry, and accordingly the components of logic circuit 30 are tailored to recognize such timer pulse. The voltage output in the form of such pulse is fed to logic circuit 30.

Logic circuit 30 comprises a voltage divider consisting of resistors 31 and 33 having a capacitor 32 shunting resistor 33. Such voltage divider is connected to DC power at 13, and resistors 31 and 33 are chosen so that a positive DC potential of about 1.2 volts appears at junction 35 to which one end of winding 24 is connected. Such logic circuit herein utilizes an NPN type transistor switch Q1 the collector of which is connected through resistor 36 to junction 13 so as to provide DC power to switch Q1. The other side of winding 24 is connected to the base of Q1, and such base has capacitor 34 connected between it and the emitter of Q1, which emitter is at ground potential. The function of capacitors 32 and 34 is to filter out and reject AC components riding on the gate pulse and initiated by winding 24 due to switching action of timer 20 when shaft 10 drives reluctor wheel 21. If desired, an additional capacitor, not shown, may be connected between junction 37 and the collector of Q1 for effecting additional rejection of such timer generated AC components. However, in this system, it may be an advantage to pass such timer generated AC components as they serve to modulate the gate or firing pulse at junction 38, thereby adding more firing energy by increasing the alternating current output from source 40 and by adding such components through switch 70 to the firing current in transformer 60. In such latter instance, capacitor 34 may be omitted. It is of course to be noted that it would be a simple matter to utilize a PNP type as Q1 with appropriate changes in the rest of the circuit comprising logic circuit 30. Hence, junction 38 is the point in the system which will change in its potential to enable switching control of the alternating current source 40 and the energy inhibit switch 70.

Operatively, when shaft 10 is not being rotated or driven by the engine, no voltage is provided by winding 24 across junctions 35 or 37. Under such condition, the base of Q1 will be at a positive potential, sufficient to maintain Q1 in its ON mode, so that junction 38 will be at ground potential. In this case, DC current will flow through winding 24 to maintain the base of Q1 at a positive potential, thereby maintaining Q1 in its ON state, in which case the point at which resistor 36 is connected to the collector of Q1 and junction 38, is at ground potential thus causing the base of Q2 to be at ground potential as well as the bases of both Q's of source 40, thereby preventing source 40 from oscillating and Q2 from conducting.

When shaft 10 is driven, a pulse having a negative excursion, is induced across winding 24 at the time when one of ribs 22 is driven past pole piece 25, providing such negative going pulse to the base of Q1 at 37 and turning off Q1, thereby causing junction point 38 to be at positive potential, and under these conditions, turning on oscillator 40 by virtue of positive DC being applied to the bases of the Q's thereof, as well as by turning on switch Q2 by virtue of such same DC positive bias being applied to its base. The manner in which Q2 obtains its collector enabling voltage will be discussed below. The following table shows the switching logic of the circuits of FIG. 1:

| Shaft 10 | Potential of Junction 37 | State of Q1 | Potential of Junction 38 | State of Q's | State of Q2 |
|---|---|---|---|---|---|
| at standstill | + | ON | ground | OFF | OFF |
| being driven | negative | OFF | + | ON | ON |

Since Q1 is generally a silicon device, it requires a base potential between 0.6 to 0.8 volts to maintain it in conductive state, and hence the +1.2 volts provided between junction 35 and ground, even considering the voltage drop in winding 24, will still maintain adequate voltage level at 37 within the stated limits for minimum sustaining voltage, so that Q1 will be in the ON state when shaft 10 is at standstill as well as when shaft 10 is driven but when ribs 22 are not opposite pole piece 25. In the ON state of Q1, junction 38 will be at ground potential thereby biasing the base of Q2 and the bases of the Q's to cause them to be non-conductive, or in their OFF states.

The divider network consisting of resistors 31 and 33 is chosen so that the voltage at junction 35 will be 1/10th the battery voltage. Hence, if the battery or power source charging such battery is defective so that only 8 volts is provided by the battery, there will still be 0.8 volts at junction 35 which will be sufficient to maintain switching action of Q1 and operate logic circuit 30. Additionally, the manner in which winding 24 is connected in the logic circuit and the large capacitance of capacitor 32, permitted at its shown location, act to provide a stable source of input voltage to winding 24, and thereby provides a very reliable switching logic circuit.

When shaft 10 is driven and one of ribs 22 is driven past pole piece 25, a negative pulse will be induced in winding 24 which is between 1.5 and 2 volts in amplitude, thereby overcoming the positive bias of the base of Q1 and driving such base negative thereby cutting off current conduction between the collector and emitter of Q1, so that Q1 in switching to its OFF state, will cause junction 38 to be raised to a positive potential so as to turn on the Q's of power source 40 and Q2 of switch 70. The manner in which the Q's of source 40 turn on and off at a particular oscillating frequency or repetition rate is well known in the art and need not be discussed.

When power source 40 is turned on during each firing cycle, that is, each time one of ribs 22 is driven past pole piece 25, such source stays on for the duration when any portion of rib 22 is opposite any portion of pole piece 25, providing the firing gate or firing period at 38 to enable firing of an igniter in an engine, not shown. Power source 40 will keep on generating rectangular waves during such firing gate by virtue of Q1 being in its OFF state and consequently Q2 and the Q's being biased so as to cause Q2 to conduct during such firing gate period and the Q's oscillate during such firing gate period. By virtue of rotation of wheel 21, when pole piece 25 is positioned between ribs 22, no firing gate is provided because there is absent the required negative going pulse as input at 37, so that Q1 is again biased sufficiently positive to switch it to its ON state thereby turning off Q2 and both Q's.

Power source 40 has as an integral part thereof a coupling output transformer the design of which controls the frequency or repetition rate of source 40. In this instance, a power source providing a 5 kilocycle rectangular repetition rate was utilized experimentally, the results of which will be discussed below. The output transformer has a center tapped primary winding 41 the ends of such winding being connected each respectively to the collectors of each of the Q's, and the emitters of these Q's being at ground potential in a common emitter configuration. The oscillator circuit utilizes Q's which are of the NPN type and preferably of the Darlington circuit configuration since such Darlington circuits will have inherently high current amplification characteristics which will provide high induced voltage levels in primary 41. Feedback winding 43 is also center tapped and the ends thereof are respectively connected, one to each base of transistors Q, so as to provide magnetic coupling between windings 43 and 41 and a feedback voltage to maintain oscillation of power source 40. The center tap of winding 43 has bias resistor 44 connected thereto to set the bias current to the proper level for enabling source 40 to be pulsed ON each time junction 38 and consequently terminal 45 is at positive potential, and simultaneously to provide such positive pulse to junction 75 so as turn on switch 70. When junction 38 is at ground potential, circuits 40 and 70 will have their respective transistors in their OFF states.

It is pointed out that NPN Darlington transistors type 2N6284 made by Motorola were used experimentally as the Q's with excellent performance resulting. It is also to be noted that PNP Darlington transistors of type 2N6287 made by Motorola give similar excellent results. However, with the PNP type transistors, circuit 40 was modified so that the collectors were at negative battery or ground potential, and the emitters were at positive DC potential, and the logic circuit had to be modified to provide the ON and OFF modes discussed above which are compatible with required potentials for the bases of the PNP transistors.

The transformer of source 40 has a secondary winding 42 which provides energy to an external load, such as capacitor 50 and primary winding 61 of transformer 60, as well as being an enabling means to initiate conduction in Q2 by providing thereto a series of positive potentials by virtue of the positive peaks of the waveform generated by circuit 40 during each firing cycle. It is to be noted that DC positive potential to the Q's is provided by virtue of the center tap of winding 41 being connected to junction 48. It is also to be noted that junction point 46 of winding 42 is connected to junction 48. It should also be pointed out that winding 42 at junction point 46 could have been connected to ground, if desired.

A capacitor 50 is provided and coupled to junction 47 of winding 42 at one side, the other side of the capacitor being connected to common terminal 63 of ignition transformer 60. Here too, such other side of capacitor 50 could have been connected to terminal 64 of transformer 60 in which case terminal 63 would have been connected to the collector of Q2.

Capacitor 50 is the means for enabling current, and hence power, to be transferred from primary circuit winding 41 through secondary 42 to the load, in this case to transformer primary 61. Without such capacitor current i would not be present in sufficient quantity in primary winding 61, and consequently voltage e across primary 61 would be inadequate. Considering that the circuit comprising winding 42, primary 61 and the reactance reflected by secondary 62 when under igniter firing, which is inductive, the capacitive reactance presented by capacitor 50 enables compensation of these inductive reactances resulting in an increased current i. The resonance principle cannot be used in its entirety to explain the phenomena involving the capacitor's compensation function, since resonance generally involves a single frequency and, consequently unlike here, unique reactance values, and in this system multiple frequencies are generated by power source 40 which involve a like number of different reactances. In any event, such capacitor 50 is selected by trying various values of capacitors until current i is at a maximum. Current i may be conveniently measured and observed by using a one-ohm high power resistor in the primary winding circuit, say between junction 64 and the collector of Q2, and measuring the voltage across such resistor by means of an accurately calibrated high frequency oscilloscope. Typical capacitor values will be in the order of between 0.2 to 1.0 microfarads.

Ignition transformer 60 was selected to have a turns ratio of 100, somewhat higher than stock automobile transformer turns ratios, since this will provide a greater voltage induced in secondary 62 and transferred to either an igniter or to a switching distributor by means of high voltage cable 65.

Circuit 70 has as its principal component, a high power, high voltage rated and high current rated power transistor Q2. Such transistor may typically be selected from the group of type 2N6251 made by RCA, type 2N6547 made by Motorola, type FT 359 made by Fairchild, or any of a series of Darlington type transistors made by Motorola of the MJ series such as MJ 10009. It is important not only to select a transistor for this purpose which will have a high collector current rating, but such transistor should also be able to withstand the high OFF state collector to emitter voltage $V_{ce}$. Bias resistor 74 of transistor switch Q2 is selected of sufficient ohmic value to limit the base current to a safe level within the rating limits of that transistor, and a resistor value is used that permits just enough base current to flow so as to enable Q2 to perform its switching function rapidly. Providing too much base current in Q2 by having too low an ohmic value for resistor 74 will slow down switching time of Q2 from its ON to its OFF state, and will tend to defeat the major purpose and use of switch 70.

In a high power system such as illustrated, which approaches 10 kilowatts of instantaneous power, separation of firing waveforms will not be possible by virtue of the fact that energy generated by source 40 and residual in its transformer windings, will tend to cause the current i to continue to flow after the Q's of circuit 40 are biased to their OFF states. Consequently, circuit 70 acts to assure rapid deprivation of energy feed to transformer 60 by inhibiting such residual energy from transfering to such transformer at the end of each igniter firing cycle. Such is accomplished in inhibiting current i flow at that time by interrupting such current flow in the output circuit by means of rapidly turning off Q2 at the same time as the Q's of source 40 are turned off. The penalty for not having such switch as Q2 in a high power unit is that pre-ignition firing will occur since the next-in-sequence igniter would be prematurely ignited by virtue of the current and voltage waveforms being continued beyond the required firing period.

A cursory examination of circuit 70, would seem to appear to indicate Q2 inoperability in view of no hard wire collector connection to a DC power source. However, as was previously mentioned, Q2 is enabled, that is the equivalent of such DC power is provided to the collector by the positive potential going peak excursions of the waveforms provided by AC source 40. The rate of such excursions, say in the order of between 2.5 and 10 kilocycles per second, though a 5 kilocycle per second rate was actually used, serves to maintain Q2 in its conductive mode throughout each and every igniter fire cycle.

A further benefit may be derived when a Darlington circuit type transistor such as an MJ 10009, MJ 10001 or an MJ 10005 by Motorola is chosen as the Q2 transistor. Such Darlington circuit is inherently a current amplifier, so that the current produced by the firing gate to trigger the base of Q2 to its ON state is amplified by Q2 and adds additional current $i_1$ to the current quantity in the primary winding. Such current injection feature is discussed below in conjunction with the computations made on this system, but it should be noted that since the current increases, the voltage e across the primary 61 will be increased by virtue of the increased current flow.

Another feature of the inventive system, including of course the variations of such system as discussed below in conjunction with the other system figures herein, is the quiescent state of power source 40 for about 25% of the system on-time. Inasmuch as Darlington circuits are used for the Q's, high AC currents circulate in their collector circuits in the ON modes of such Q's. Such high currents will contribute to high induced voltages in winding 42, and would normally require large heat sinks to dissipate the heat generated thereby. Since in this power generator, each of the Q's is in its ON state only half the time of each cyclic excursion of the AC current produced therein, and since each igniter firing period is less than one-half its non-firing period in time duration, triggering bias winding 43 in order to turn the Q's on and off, will permit the transistors to be maintained at relatively low operating temperatures because each of the Q's will in effect have a duty cycle of less than 25%. Further, switching such power source 40 to its ON mode will create a transient voltage at the beginning of each firing cycle which will be greater in amplitude than the voltage normally deliverable by such source 40, absent this type of switching.

Referring to FIG. 1a, the system shown therein is identical to the system as discussed in FIG. 1, with the following differences.

Capacitor 50 is connected between junctions 47 and 64, instead of between junctions 47 and 63, and terminal 63 of transformer 60 is herein connected to ground.

Switch Q2 has its emitter connected to junction 46 of winding 42 and its collector to junction 48 and consequentily to terminal 13 at which terminal, DC positive potential is supplied to the collector of Q2. However, although Q2 collector is now hard-wired to a positive DC terminal, the emitter thereof is not hard wired to ground. Analogous to the discussion in connection with FIG. 1 as to how the Q2 energy inhibit switch is enabled, in this configuration, the negative peak excursions of the waveforms provided by AC source 40 to the emitter is the equivalent of a ground potential, thereby maintaining Q2 in its conductive mode throughout each and every igniter fire cycle. There is some benefit in connecting Q2 as shown when its current amplification factor is not essential, because here the resultant collector to emitter voltage would be lower than in the case of FIG. 1, and hence the collector to emitter voltage rating of Q2 may be substantially reduced.

Referring to FIG. 2, the system illustrated is identical to the systems as discussed in connection with FIGS. 1 or 1a, except that trigger means 20 is replaced by trigger means 220 and logic circuit 30 is replaced by logic circuit 230.

Trigger means 220 is a conventional cam actuated pair of contactors wherein engine distributor shaft 10 drives cam 221, the high portions of which cause the cessation of cooperation between contactors 222 and 223. When the high portions of cam 221 are not in cooperation with contactor 222 such contactor will cooperate with contactor 223. Contactor 223 is connected to junction 231 of logic circuit 230, which junction is also the base of transistor switch Q3. Resistor 232 provides a DC positive potential to junction 231 when contactor pair 222-223 are open, and thus enables base current in Q3 to flow. When contactor pair 222-223 are closed, junction 231 is at ground potential. The collector of Q3 is connected to the DC positive terminal of battery 11 by virtue of its connection to junction 13. The emitter of Q3 is connected through resistor 233 to ground.

Thus the switching logic of circuit 230 may be summarized by the following table:

| Contactor Pair 222-223 | Potential at Junction 231 | State of Q3 | Potential at Q3 Emitter | State of Q's | State of Q2 |
| --- | --- | --- | --- | --- | --- |
| closed | ground | OFF | ground | OFF | OFF |
| open | + | ON | + | ON | ON |

Hence, when cam 221 causes contactors 222-223 to cooperate, the base of Q3 is biased at ground potential, collector current does not flow in Q3 and Q3 does not conduct. When cam 221 causes contactor pair 222-223 to open, ground is removed from junction 231 and base current flows in Q3 and Q3 conducts thereby providing positive DC potential at the emitter thereof. Such emitter positive potential enables Q2 and the Q's to be biased DC positive and to conduct. When Q3 does not conduct, the emitter thereof will be at ground potential due to lack of collector current, thereby causing Q2 and the Q's to be turned off due to the ground potential provided at their respective bases.

Thus it can be seen that the logic circuit and the timer as herein illustrated may be utilized in the circuits of FIGS. 1 or 1a instead of the timers shown therein, and yet maintain all the same functions and operations of the system as discussed in connection with FIGS. 1 and 1a.

Figure 3:
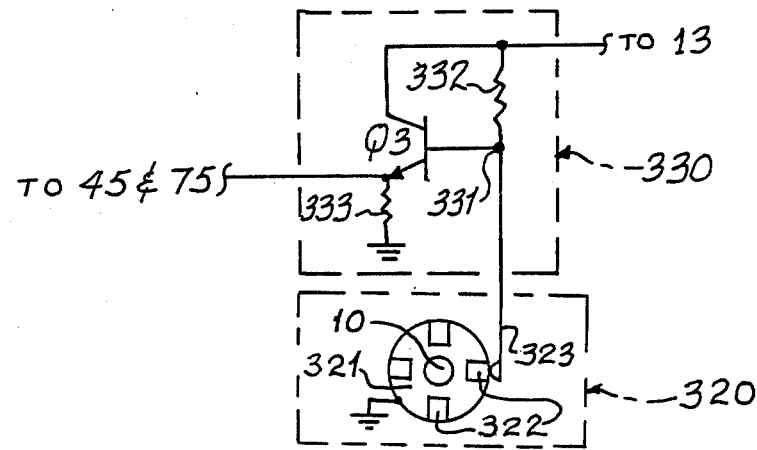
FIG. 3 is a schematic of the same system illustrated in either FIGS. 1 or 1a but having a driven wheel and contactor assembly acting as the timer.

Referring to FIG. 3, the system illustrated is identical to the system as discussed in connection with FIGS. 1 or 1a, except for trigger means 20 being replaced by trigger means 320 and logic circuit 30 being replaced by logic circuit 330.

Logic circuit 330 is identical in structure and function to logic circuit 230 described in connection with FIG. 2. In circuit 330, junction 331, resistor 332 and resistor 333 are respectively identical to junction 231, resistor 232 and resistor 233 of FIG. 2.

Trigger means 320 employs an electrically conductive disk 321 attached to and driven by shaft 10 of the engine. The shaft being at ground potential will electrically ground disk 321. Disk 321 has a plural number of electrically insulative members 322 regularly spaced at the periphery of the disk within the disk confines. The number of members 322 will be equal to the number of igniter circuits as provided by a high voltage distributor, not shown but conventional. Here, four igniter circuits and corresponding four igniters, one for each of the four engine cylinders, is assumed. Contactor 323 is connected to junction 331 and is in cooperation with the periphery of the disk. Consequently, when insulative member 322 is in cooperation with contactor 323, the base of Q3 being at the same potential as junction 331, is biased with a DC positive potential and Q3 conducts thereby providing a positive potential at its emitter and consequently providing such positive bias to junctions 45 and 75 thereby turning on Q2 and the Q's to perform the functions as hereinabove described in connection with FIGS. 1 or 1a. When contactor 323 is in cooperation with the metallic or conductive portion of disk 321, junction 331 is at ground potential, Q3 does not conduct, and junctions 45 and 75 are at ground potential, thereby turning off Q2 and Q's.

The following logic table is applicable to show the logic of FIG. 3 configuration:

| Contactor 323 in Cooperation With | Potential at Junction 331 | State of Q3 | Potential at Q3 Emitter | State of Q's | State of Q2 |
| --- | --- | --- | --- | --- | --- |
| metallic portion of disk 321 | ground | OFF | ground | OFF | OFF |
| member 322 | + | ON | + | ON | ON |

Figure 4:
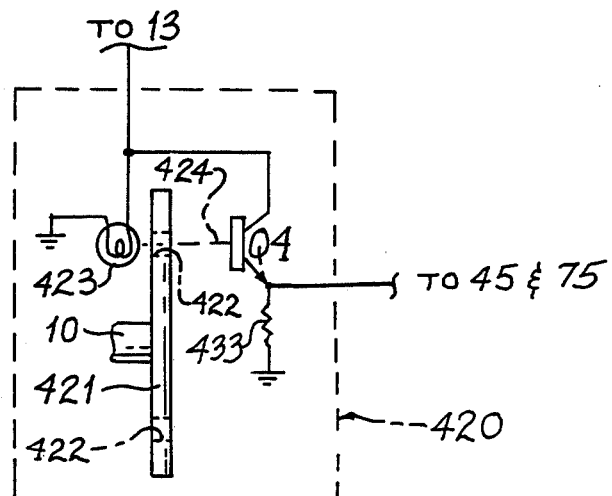
FIG. 4 is a schematic of the same system illustrated in either FIGS. 1 or 1a but having an optical timer.

Referring to FIG. 4, the system illustrated is identical to the system as discussed in connection with FIGS. 1 or 1a, except that trigger means 20 and logic circuit 30 are replaced by an optical trigger logic circuit 420.

Circuit 420 comprises a disk 421 driven by distributor shaft 10. Disk 421 has apertures 422 regularly spaced in the disk at the periphery thereof. Powered illumination means 423 is provided at one face of disk 421 for optically intermittently illuminating the base of an optically sensitive transistor Q4 by means of a light beam 424 passing through such apertures 422 to turn Q4 on each time light beam 424 impinges on the base of Q4 and thereby causes the emitter of Q4 to rise to a positive DC potential by virtue of collector current flowing in Q4. When light beam 424 is blocked by the opaque portion of disk 421, Q4 is off and no collector current flows in Q4, and consequently the potential at either end of resistor 433 is the same, namely ground potential. Hence, when Q3 is in its OFF state, junction 45 and 75 will be at ground potential maintaining Q2 and the Q's in their OFF states. On the other hand, when Q3 is in its ON state, junctions 45 and 75 will be at positive DC maintaining Q2 in its ON state and the Q's in their oscillatory modes.

The following logic table is applicable to show the logic of the FIG. 4 configuration:

| Light Beam 424 | State of Q4 | Potential of Q4 Emitter | State of Q's | State of Q2 |
| --- | --- | --- | --- | --- |
| blocked by disk 421 | OFF | ground | OFF | OFF |
| passes through aperture 422 | ON | + | ON | ON |

Figure 5:
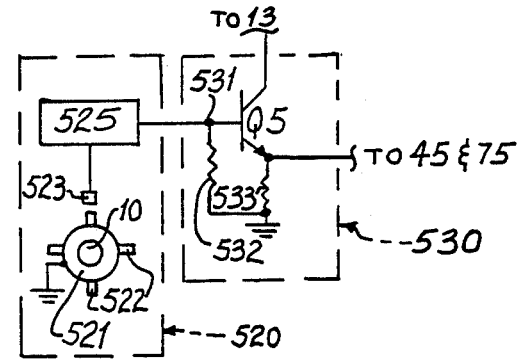
FIG. 5 is a schematic of the same system as illustrated in either FIGS. 1 or 1a but having a modulated oscillator as the timer.

Referring to FIG. 5, the system illustrated is identical to the system as discussed in connection with FIGS. 1 or 1a, except that trigger means 20 is replaced by trigger means 520, and logic circuit 30 is replaced by logic circuit 530.

Trigger means 520 employs an angular modulated oscillator wherein oscillator 525 is modulated by virtue of a variable capacitor being driven by distributor shaft 10. Such capacitor comprises a rotatable plate 521 having protrusions 522 regularly spaced at the periphery of plate 521 and having a single fixed plate 523 connected to oscillator 525. Plate 521 is at ground potential since it is attached to shaft 10 which is grounded. Oscillator 525 provides a positive going signal output imposed upon junction 531 of logic circuit 530 whenever a protrusion 522 is driven past fixed plate 523. More details concerning this modulation method is available in U.S. Pat. No. 4,122,815 issued Oct. 31, 1978 which was incorporated by reference herein.

Logic circuit 530 has a bias resistor 532 connected between base of transistor Q5 at 531 and ground so as to maintain the base at ground potential until such time as a positive signal from oscillator 525 drives the base sufficiently positive to cause base current to flow and hence to cause collector current to flow and Q5 to conduct.

The emitter of Q5 has resistor 533 connected between it and ground, so that when junction 531 is at ground potential and no collector current flows, the Q5 emitter and junctions 45 and 75 will be at ground potential thereby maintaining Q2 and the Q's in their OFF states. When a positive going signal from oscillator 525 appears at junction 531 due to the oscillator being angularly modulated, the base of Q5 will be driven positive and base current will flow to cause Q5 to switch to its ON state, thereby raising the Q5 emitter and junctions 45 and 75 to a positive DC potential and causing Q2 to be switched to its ON state and the Q's to oscillate.

The following table expresses the logic performed by the FIG. 5 configuration:

| Oscillator 525 | Potential at Junction 531 | State of Q5 | Potential at Q5 Emitter | State of Q's | State of Q2 |
|---|---|---|---|---|---|
| not modulated | ground | OFF | ground | OFF | OFF |
| angularly modulated | + | ON | + | ON | ON |

Figure 6:
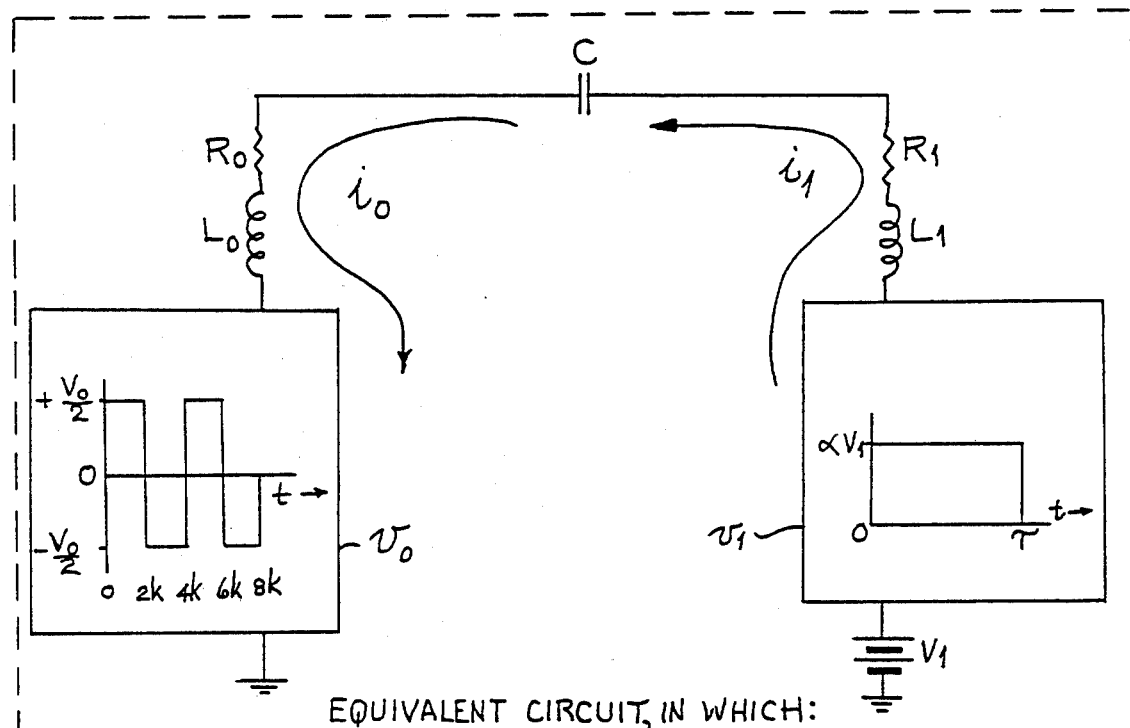
FIG. 6 is a schematic of an equivalent circuit which represents any of FIGS. 1, 1a, 2, 3, 4, 5 or 6, including a listing of parameters and typical values used in connection with such equivalent circuit to enable system performance computations to be made.

Referring to FIGS. 6, 7, 8 and 9, the equivalent circuit for each of configurations in FIGS. 1, 1a, 2, 3, 4 and 5, may be represented by FIG. 6 for computation purposes and theoretical analysis. The parameters of such equivalent circuit are utilized in the equations listed in FIG. 7 in symbolic terms. The numerical values of the parameters as used in the computations are tabulated within FIG. 6. Such numerical values when substituted for the symbolic terms enables the solutions for current and voltage components to be graphed in FIGS. 8 and 9.

Accordingly, $v_o$ is the rectangular wave voltage function generated by power source 40, in effect in series with the inductors, resistors and capacitor of the equivalent circuit. Voltage $V_1$, constituting the voltage of battery 11, also feeds the circuit from its end, opposite to the end showing the AC power source connection. Such method of drawing the equivalent circuit is for convenience and clarity, and it really makes no difference in a series circuit where the voltage sources are located in order to develop the equations for such circuit.

Voltage $v_1$, represented by a single pulse rectangular wave having a duration period of $\tau$, is shown in effect in series with the other circuit components, and such pulse $v_1$ represents the firing gate or igniter firing period provided by the several logic circuits at junctions 45 and 75 in any of the configurations of FIGS. 1–5.

The following table shows the correlation of the symbolic terms used in FIG. 6 and the computations shown in FIG. 7 with the components as identified in FIGS. 1–5.

| Symbol in FIG. 6 | | Corresponding Number in FIGS. 1–5 |
|---|---|---|
| $L_o$ | effective inductance of AC power source | 42 includes reflected inductance of 41 |
| $R_o$ | DC series resistance of $L_o$ | not shown |
| $L_1$ | effective inductance of ignition transformer at primary | 61 includes reflected inductance of secondary 62 |
| $R_1$ | DC series resistance $L_1$ | not shown |
| C | capacitor | 50 |
| $v_o$ | voltage output of AC source | not shown |
| $v_1$ | firing gate voltage | not shown, but appears at 38, 45 and 75 |

The analysis was made by computing the transient current response for the system when current component $i_o$ flows, and then computing the transient response for such system when current component $i_1$ flows. The total transient current response is then obtained by superposition of both current components $i_o$ and $i_1$.

The voltage components $e_o$ and $e_1$ induced in primary winding $L_1$ were derived from the current component solutions. Such induced voltage components are shown in their composite form in FIG. 1 as voltage e across primary winding 61.

It should be noted that $e_1$ would be quite small if Q2 were not a Darlington transistor type, but is quite significant when Q2 is of the Darlington category.

With the foregoing in mind, and examining FIG. 7 summary of the mathematical functions, derived using reasonable approximations, equation (1), in integro-differential form, represents the voltages added around the loop of current component $i_o$ as in FIG. 6, in accordance with Kirchoff's law. Likewise, equation (2) represents in integro-differential form the voltages added around the current loop $i_1$. Expressions (3) and (4) are the voltages $v_o(t)$ and $v_1(t)$ respectively and stated as a function of time.

To obtain the transient solution of equation (1), it was necessary to first transform equation (1) by Laplace methods to the complex domain from its time domain. In such complex domain the Laplace function was evaluated by solving the residues at the resultant poles of such transformation function. Such residues provide a retransformed function from the complex to the time domain and such function is stated by equation (5) which is the solution for the current component $i_o$. In the process of transformation and retransformation, certain approximations permitted neglecting the relatively insignificant frequency components so as to simplify the resultant expressions.

The transient solution of equation (2) for current $i_1$ resulting in equation (6) was made by a similar mathematical process.

Figure 8:
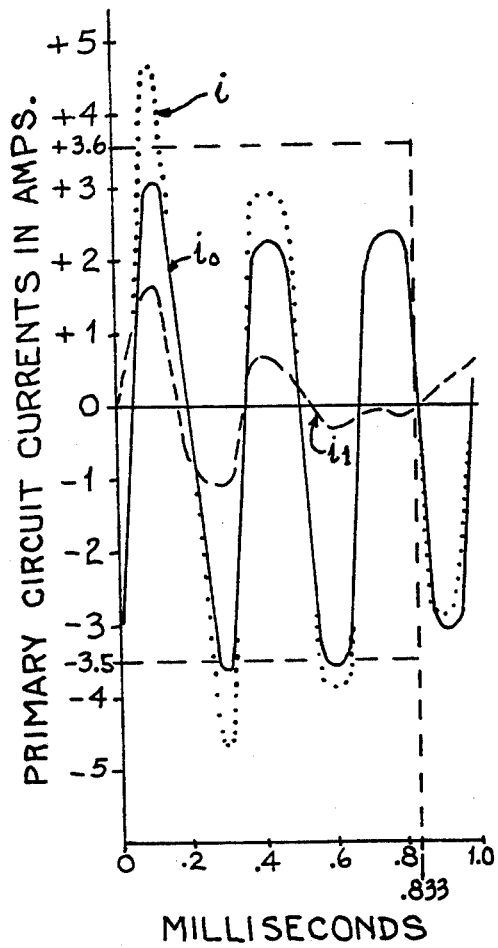
FIGS. 8 and 9 are respectively graphs of the primary circuit current and voltage components, constituting the results when the mathematical solutions are evaluated for applicable time periods.

The total current i, is the sum of the current components $i_o$ and $i_1$ and such total current is shown in FIG. 8 by the dotted line graph. Current i is significant for the igniter firing time period of 0.833 milliseconds, used herein in the computations.

The voltages induced in the primary winding, are by Faraday's law of induction, the negative of the total time derivative of the current multiplied by the effective inductance of such primary winding. The induced voltage component $e_o$ is obtained by differentiating equation (5) and multiplying the derivative obtained by $-L_1$. The expression for the voltage component $e_o$ is shown in equation (8) and such equation (8) is graphed for various values of time, up to one millisecond, in FIG. 9.

Figure 9:
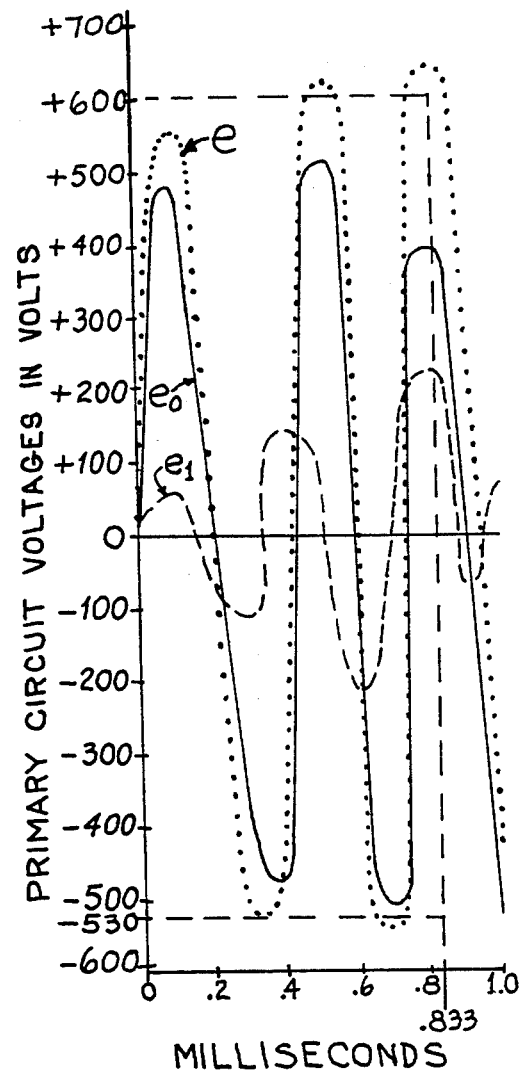

It can be seen from FIG. 9, that even with a Darlington Q2 circuit, the $e_1$ component will be relatively small compared to the $e_o$ component, but nontheless contributes to a higher voltage induced in the ignition transformer primary winding.

The sum of the voltage components, $e_o+e_1=e$, as stated by expression (10) is graphed in FIG. 9 as the dotted curve therein, and serves to show the increased induced voltage due to the presence of $e_1$ component.

Expressions (11) through (14) deal with theoretical instantaneous power and energy, obtained by making a graphic evaluation of the curves of FIGS. 8 and 9. The period of interest is our assumed firing period $t$ of 0.833 milliseconds, and hence graphic integration of the current and voltage involved only such firing period. Such firing period yields the worst case condition and represents the lowest energy quantities delivered by this system.

The +3.6 ampere level and the −3.5 ampere level in FIG. 8 represent the average current swing for the total current i, which amounts to an average current swing of 7.1 amperes.

Similarly the +600 volt level and the −530 volt level in FIG. 9 represents the average voltage swing of 1130 volts.

Using the average current and voltage swings, expression (11) shows that the system, in its worst case mode, will develop 8023 watts of power.

The energy in the primary circuit will be a product of the computed instantaneous power multiplied by the firing period of t=0.833 milliseconds, and further multiplied by the duty cycle factor of the AC power source. Such duty cycle, T, being 0.5, since when one of the transistors in the AC power source is on the other is off. The square of such duty cycle is used to account for such duty cycle in both the voltage and current waves of such AC power source. Accordingly, the primary winding energy level of 1.67 watt-seconds was computed in expression (12).

The energy level in the secondary circuit of the ignition transformer and consequently the igniter firing energy may be obtained by taking into consideration the transfer efficiency of the ignition transformer. Accordingly, for an efficiency factor of 0.9, expression (13) indicates an igniter fire energy of 1.5 watt-seconds.

It is now possible to compare the effectiveness of the inventive system with a conventional Kettering system. The Kettering system, according to computations made in U.S. patent application Ser. No. 812,912 filed July 5, 1977, now U.S. Pat. No. 4,176,647, delivers an energy level of $0.936 \times 10^{-2}$ watt-seconds to an igniter. Hence the theoretical advantage of this system N, may be measured as a ratio of this system's igniter firing energy over that of the Kettering system. Such computation at (14) shows an energy advantage over the Kettering system of 160 or 16,000 percent.

Referring to FIGS. 10–15, actual oscillographic photographs were made of laboratory measurements of the current and voltage waveforms and their peak excursions simulating intermittent ignition firing periods of an ignition system as used in an automotive engine, but with the inventive system instead of the conventional system. These figures also show actual photographs of firing patterns of an igniter energized by the inventive system and an igniter energized by a conventional system.

The table below, shows peak-to-peak values of voltage across primary winding 61 and peak-to-peak values of current through such primary winding, as measured by a calibrated Hewlett-Packard 50 megacycle oscilloscope. The oscilloscopic patterns of the current were made by inserting a high power one-ohm resistor in series with the primary winding and connecting the oscilloscope input leads thereacross. By Ohm's law, the voltage measured will be the current, since such voltage is divided by one-ohm. This table shows the voltages and currents under conditions when both Darlington type transistors and when non-Darlington type transistors are used in the Q2 switch. FIG. 2 configuration was used for these laboratory tests, wherein a conventional distributor was connected to the secondary winding 62 and in turn connected to a number of igniters of which the igniter in FIG. 14 was one. Such distributor was driven by an electric motor at a speed simulating medium distributor rotation speed of a distributor in an automobile. Similar tests were made in the laboratory of the FIG. 1 and FIG. 1a configurations with similar results, but the latter configuration tests were not photographed.

| Parameter | Non-Darlington Q2, 2N6251 or 2N6547 | Darlington Q2, MJ 10005 - Motorola |
|---|---|---|
| i (peak-to-peak) | 8.33 amperes | 12.5 amperes |
| e (peak-to-peak) | 1200 volts | 1330 volts |
| P = ie | 9996 watts | 16,625 watts |
| $e_{primary}$ (t = .833 ms. and T = .5) | 2.08 watt-seconds | 3.46 watt-seconds |
| $e_{igniter}$ | 1.87 watt-seconds | 3.12 watt-seconds |
| $N = \frac{e_{igniter}}{e_{Kettering}}$ | 200 | 333 |

The foregoing results show correlation with the magitudes of voltage and current levels approximated by the computations, but actually higher voltage, current and power and energy levels were obtained than were computed. Such differences can be easily accounted for by virtue of neglecting higher order and lower amplitude frequency components in the computations in order to simplify such computation process. Here, the difference between the use of Darlington Q2 switch and a non-Darlington switch becomes evident in terms of the increased voltage, current, power and energy levels.

Figure 10:
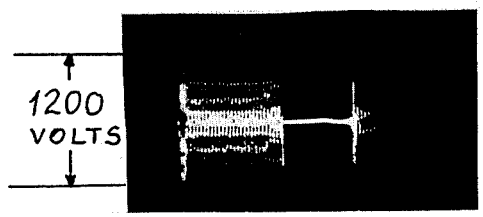
FIG. 10 is an actual oscillographic photograph of the total voltage across the primary winding, when the system is operating properly.
Figure 11:
FIG. 11 is an actual oscillographic photograph of the voltage across the primary winding when the energy switching control of the primary circuit is by-passed.
Figure 12:
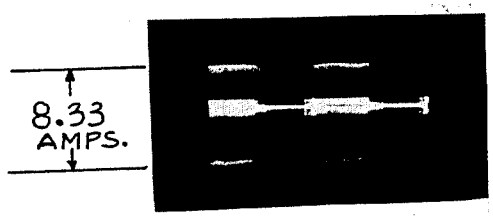
FIG. 12 is an actual oscillographic photograph of the total current flowing in the primary winding, when the system is operating properly.
Figure 13:
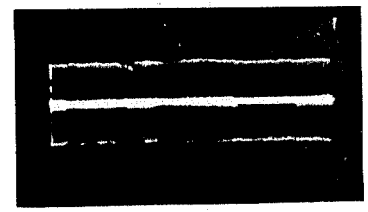
FIG. 13 is an actual oscillographic photograph of the current flowing in the primary winding when the energy switching control of the primary circuit is by-passed.

The foregoing measurements apply to FIGS. 10 and 12 for the current and voltage levels and patterns when Q2 is in circuit and the system is operating properly. However, when Q2 is not in circuit or by-passed, which may be accomplished by removing Q2 from its socket and electrically connecting the collector and emitter terminals of the socket, the results obtained are as shown in FIG. 11 for the current pattern and in FIG. 13 for the voltage pattern. Such results indicate that there is residual energy stored in the coupling transformer of the AC power source and transfer of such residual energy to the ignition transformer primary after the timer of the system and its logic circuit in operation had biased the Q's of the AC source to their non-conducting states. Such residual energy is cut off by Q2 control simultaneously with deactivation of the AC source, as hereinabove explained, the Q2 serving to inhibit current flowing, due to residual energy in the coupling transformer, at the end of each igniter firing period.

FIGS. 10-13 also show that in high energy power sources, such as those approaching about 8 kilowatts of power, an additional Q2 type switch is required. These figures also serve to prove that either the collector or emitter of the Q2 switch need not be hard-wire connected to a DC power source to be operative, but can be enabled by the AC voltage peaks from the AC power source.

It also becomes evident from the foregoing, that Q2 utilized to control igniter firing energy, also functions to increase the energy level of the system by its switching action and by amplifying the firing gate current, as such amplified current is added to the current provided by the AC power source.

Figure 14:
FIG. 14 is an actual photograph of an igniter showing the multitude of firing arcs provided by the inventive system.

The effect of delivering high energy to an igniter is clearly seen in FIG. 14 in terms of the large quantity of radial arcs obtained when the system of FIG. 2 was set up in the laboratory and connected as hereinabove discussed. The arcs as seen in FIG. 14 cover an area of approximately 77 square millimeters as compared with a conventional arc area of less than 1 square millimeter. The igniter in FIG. 14 is of the 18 millimeter base diameter type commonly used in FORD automobiles, and such igniter had its spark-gap adjusting member removed so that the arcs generated by the inventive system would have the longest possible length.

Figure 15:
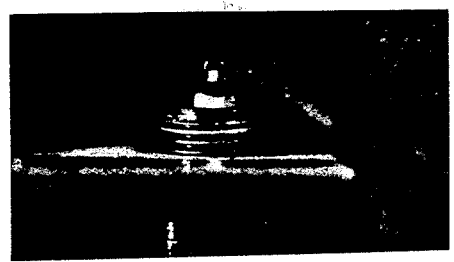
FIG. 15 is an actual photograph of a typical igniter firing when energized by prior art systems, showing the conventional small ignition spark.

A comparison with a conventional Kettering system, utilizing an igniter of conventional type with its spark gap setting in accordance with automotive manufacturer's specification, may be made with the performance of an igniter in the inventive system. The conventional Kettering system was set up in the laboratory with a driven conventional distributor similar to the laboratory set up for the inventive system as discussed above. FIG. 15 therefore represents the Kettering system firing one of its igniters. The difference in performance between the Kettering system, as photographed, with the inventive system in terms of arc area coverage and energy delivered to ignite the engine fuel, is rather startling, and self evident from the results obtained.

What is claimed is:

1. An ignition system including an ignition transformer having a primary winding, said system imposing AC energy as an excitation function upon the primary winding, comprising the combination of:
 a power source having output means, said output means being coupled to the primary winding, said primary winding and output means comprising a primary circuit; and
 switching means, coupled to the primary circuit, for intermittently interrupting current flow in said primary circuit and for providing discrete separation between successive output waveforms of said system, said output means also being means for enabling current conduction through the switching means.

2. The invention as stated in claim 1, wherein said primary circuit includes a capacitor in series therewith.

3. The invention as stated in claim 1, wherein said power source generates an output waveform at said output means for each ignition cycle, said waveform comprising a plural number of excursions of substantially uniform intervals therebetween.

4. The invention as stated in claim 1, wherein said switching means increases the energy level in said transformer.

5. The invention as stated in claim 1, wherein said switching means increases the voltage level induced in the primary winding and amplifies the current flowing in said primary winding.

6. The invention as stated in claim 1, wherein said switching means comprises a Darlington circuit.

7. The invention as stated in claim 1, wherein said power source has oscillatory stages and wherein said oscillatory stages comprise Darlington amplifying circuits.

8. The invention as stated in claim 7, including logic means coupled to said Darlington circuits for intermittently providing bias to said circuits.

9. The invention as stated in claim 1, wherein said switching means intermittently provides energy which intermodulates with the alternating current.

10. The invention as stated in claim 1, wherein said primary circuit alters excursion uniformity of the alternating current.

11. The invention as stated in claim 1, including logic means coupled to the switching means for intermittently activating and deactivating said switching means.

12. The invention as stated in claim 1, wherein said switching means is connected to said power source and electrically coupled to said primary circuit.

13. The invention as stated in claim 1, wherein said system includes a direct current supply and wherein said switching means is connected between the direct current supply and the output means.

14. The invention as stated in claim 1, wherein said primary winding is in series with the output means.

15. The invention as stated in claim 1, including:
 logic means, coupled to said power source and to said switching means, for substantially simultaneously providing bias thereto; and
 trigger means, coupled to the logic means, for intermittently activating said logic means.

16. The invention as stated in claim 15, wherein the trigger means comprises a pulse generating magnetic timer.

17. The invention as stated in claim 15, wherein the trigger means comprises cam actuated contactors.

18. The invention as stated in claim 15, wherein the trigger means comprises an elecrically conductive disk having a plural number of electrically insulative members regularly spaced at the periphery of the disk within the confines of said disk, and a contactor coupled to the logic means and in cooperation with said periphery.

19. The invention as stated in claim 15, wherein the trigger means comprises a disk having apertures regularly spaced in the disk at the periphery of said disk and illumination means at one face of said disk for optically illuminating said logic means through said apertures.

20. The invention as stated in claim 15, wherein the trigger means comprises a modulated oscillator coupled to said logic means.

21. A method for electrically igniting fuel in a fuel burning engine, comprising in combination the steps of:
 (a) generating an alternating current waveform which has a plural number of excursions for each igniter firing;
 (b) arming an electronic switch by means of said waveform;

(c) passing said alternating current through a primary winding of a transformer, through a capacitor and through said electronic switch; and (d) inhibiting generation of said alternating current and interrupting energy transfer to said primary winding during time intervals between each said igniter firing.

22. The method as stated in claim 21, including the step of:

(e) increasing the energy level in said primary winding, concurrently with step (c).

23. The method as stated in claim 21, including the step of:

(f) compensating for reactive components of the primary winding and of a power source which generates said alternating current, concurrently with step (c).

* * * * *